United States Patent [19]

Andreasson

[11] E Re. 31,192

[45] Reissued Mar. 29, 1983

[54] ROLL STAND WITH MEANS FOR JOINING A WEB TO ANOTHER WHEN UNWOUND FROM ROLLS

[75] Inventor: Bengt A. Andreasson, Åmål, Sweden

[73] Assignee: AB Åmåls Mekaniska Verkstad, Sweden

[21] Appl. No.: 360,051

[22] Filed: Mar. 19, 1982

Related U.S. Patent Documents

Reissue of:

[64] Patent No.: 4,194,701
Issued: Mar. 25, 1980
Appl. No.: 950,449
Filed: Oct. 11, 1978

[51] Int. Cl.[3] ..... B65H 19/14; B65H 23/06

[52] U.S. Cl. ..... 242/58.3; 156/502; 242/56 R; 242/75.4

[58] Field of Search ..... 242/58.3, 58.1, 58.2, 242/58.4, 75.42, 58.5, 56 R, 75.4, 75.41; 156/502, 504

[56] References Cited

U.S. PATENT DOCUMENTS

| | | | |
|---|---|---|---|
| 1,945,136 | 1/1934 | Cline | 242/75.41 |
| 2,045,059 | 6/1936 | Tomlin | 242/75.4 |
| 2,155,431 | 4/1939 | Wieking | 242/58.3 |
| 3,061,227 | 10/1962 | Peterson | 242/75.42 |
| 3,309,036 | 3/1967 | Anderson | 242/58.3 |
| 3,895,763 | 7/1975 | Tokuno | 242/58.3 |
| 4,010,061 | 3/1977 | Tokuno | 242/58.3 |
| 4,170,506 | 10/1979 | Marschke | 242/58.5 |

*Primary Examiner*—Edward J. McCarthy
*Attorney, Agent, or Firm*—Murray and Whisenhunt

[57] ABSTRACT

A roller stand incorporating a device adapted to join a running web of material being unwound from a first roll to a web of material of a second roll and comprising a roll-holding device including two unwinding stations, means to cut the running web, a mechanism to exert a braking force on the spindles supporting said first and second rolls, and means provided to transfer rotational motion of said roll-support spindles to said braking mechanism by means of free-wheel members, said members being arranged to control said braking mechanism selectively for application of braking force on the roll-support spindle that at the moment has the highest rotational speed.

7 Claims, 7 Drawing Figures

Fig.3
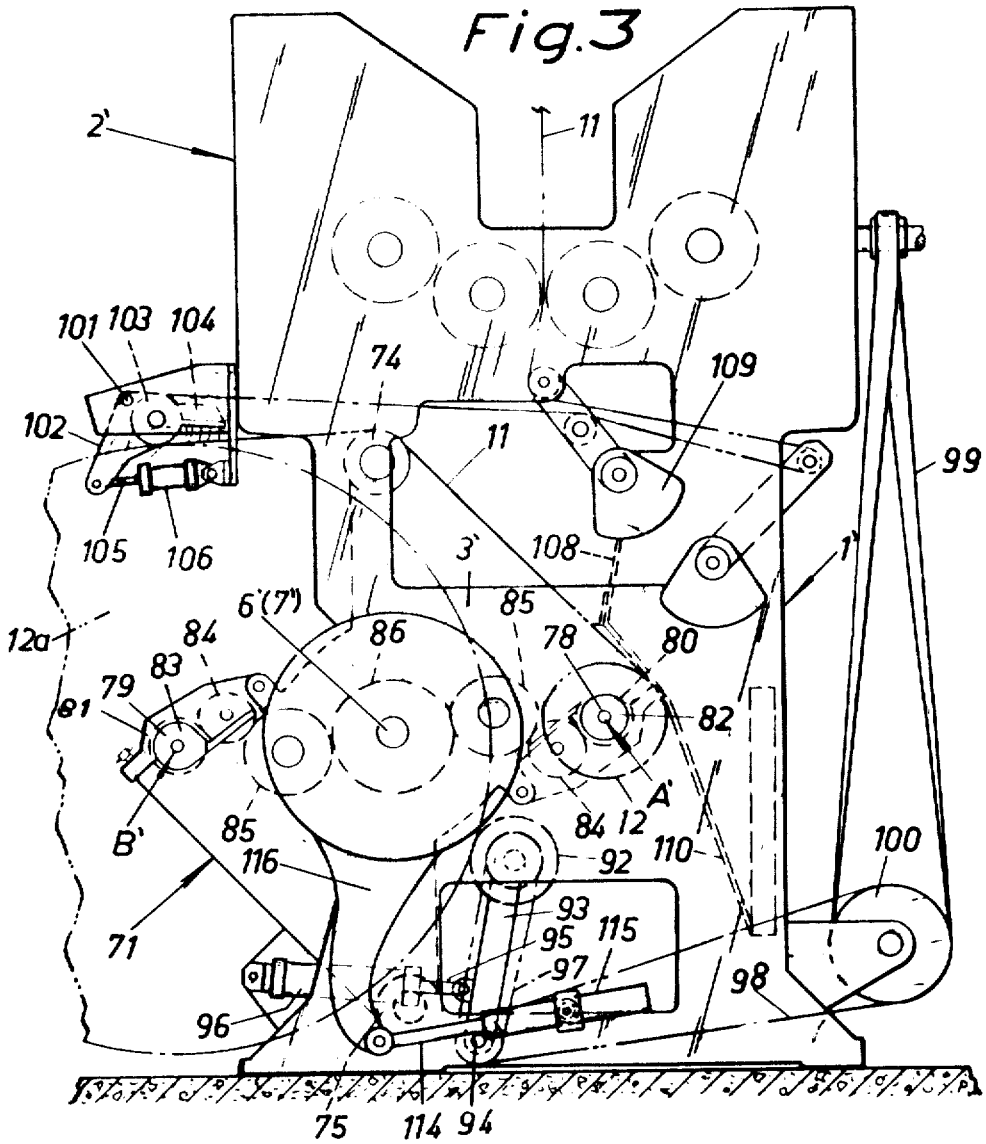
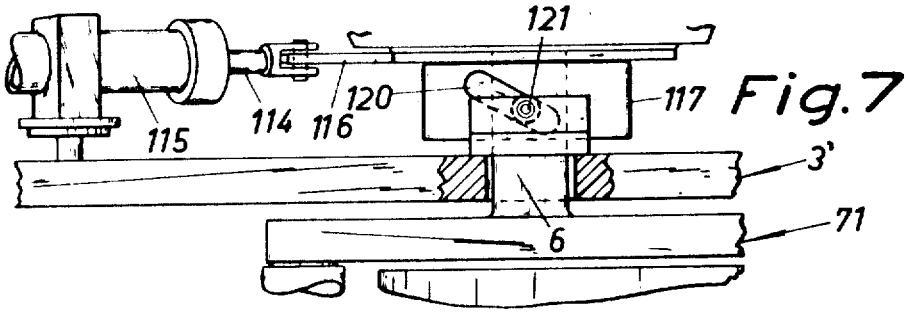
Fig.7

ROLL STAND WITH MEANS FOR JOINING A WEB TO ANOTHER WHEN UNWOUND FROM ROLLS

Matter enclosed in heavy brackets [ ] appears in the original patent but forms no part of this reissue specification; matter printed in italics indicates the additions made by reissue.

BACKGROUND OF THE INVENTION

In production machines that work with a web of material that is unwound from a roll, such as is the case in e.g. rotary printing presses, the unwinding roll is arranged in a roller stand, e.g. mounted on a shaft and provided with a braking mechanism which is arranged on the shaft or on the roll periphery and adjusted to allow control of the tension in the web part extending between the roll and the production machine. When the roll is exhausted, the whole production machine is stopped and fitted with a new roll, whereafter the machine may again be set in motion.

In the case of high-speed production machines, roller stands with means for automatic roll shifting are used to increase the machine output and to minimize the effects of disturbances to the production process, e.g. to the drying of printing ink, etc.

Roller stands of this kind are provided with at least two attachment points for the rolls, whereby space is provided for one unwinding roll as well as for one new roll. The roller stand with means for automatic roll shifting is arranged in such a manner that when the web of the unwinding roll is nearly exhausted, the new roll will automatically, or through a push-button signal, be brought to rotate while driven either from the centre or by drive belts abutting against the roll periphery. The leading end of the web on the new roll adheres lightly to the underlying turn of the web and on its upper face a coat of glue is applied (or e.g. a tape which is adhesive on both sides). In the area of the joint between the web of the unwinding roll and that of the new roll the paper webs are brought into contact with one another with the aid of a brush and/or a roller and once the leading end of the web of the new roll is glued to the unwinding web the function of a severing knife is initiated to cut off the previously unwinding roll. The web of the new roll is now joined to the paper web.

To ensure that the above-mentioned system will function, careful synchronization is required between the speed of the running web and the peripheral speed of the new roll. This is achieved e.g. with the aid of electronic comparator systems, whereby the peripheral speed of the new roll is measured by a tachometer generator the signal of which is compared with a corresponding signal issued by a generator mounted on e.g. the main shaft of the production machine. With the aid of other automatic means the peripheral speed of the new roll is to be brought to coincide with that of the unwinding web.

To enable continuous unwinding of the web of material the roller stand must be equipped with two unwinding stations. Consequently, considerable floor space is required for the roller stand. In addition, the roller stand becomes complex because as a rule one braking mechanism is required for each unwinding station to retain the web tension at the required level.

SUMMARY OF THE INVENTION

The purpose of the subject invention is primarily to remedy the drawbacks outlined above, viz. to reduce space requirements and to make the structure somewhat cheaper in that only one braking mechanism, common to both stations, is required. In addition, a preferred embodiment of the invention provides the advantage of making the braking mechanism easily accessible for servicing and adjustments. In accordance with a further embodiment of the invention the rolls with the web material thereon may be laterally adjusted in a convenient manner in relation to the frame of the roller stand.

The invention is characterised by the provision in the frame of a roller holding device on which the two unwinding stations are arranged and by the provision of a device adapted to transfer the rotational movement of the roll-support spindles to the braking mechanism, said device comprising a so-called free wheel member adapted to connect to the braking mechanism that one of the roll-support spindles that at that moment has the highest rotational speed.

BRIEF DESCRIPTION OF THE DRAWINGS

The invention will be described in closer detail in the following with reference to the accompanying drawings illustrating the invention as applied in a printing press roller stand.

FIGS. 2 and 3 are partly diagrammatical end views of a roller stand in accordance with the invention, some details thereof being shown in different positions.

FIG. 7 illustrates on an enlarged scale a plan view of the right-hand part of the roller stand in accordance with FIG. 5.

DETAILED DESCRIPTION OF A PREFERRED EMBODIMENT

Figure 2:
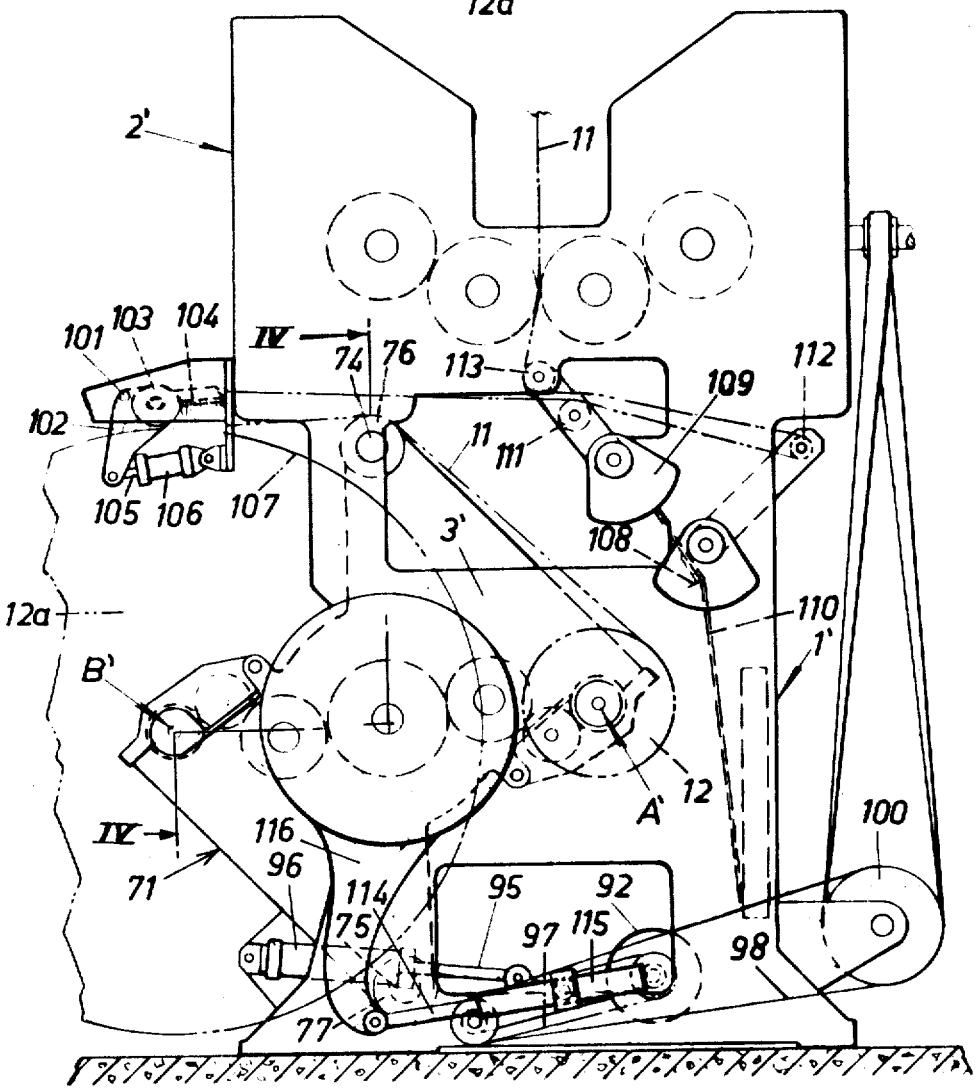
Figure 4:
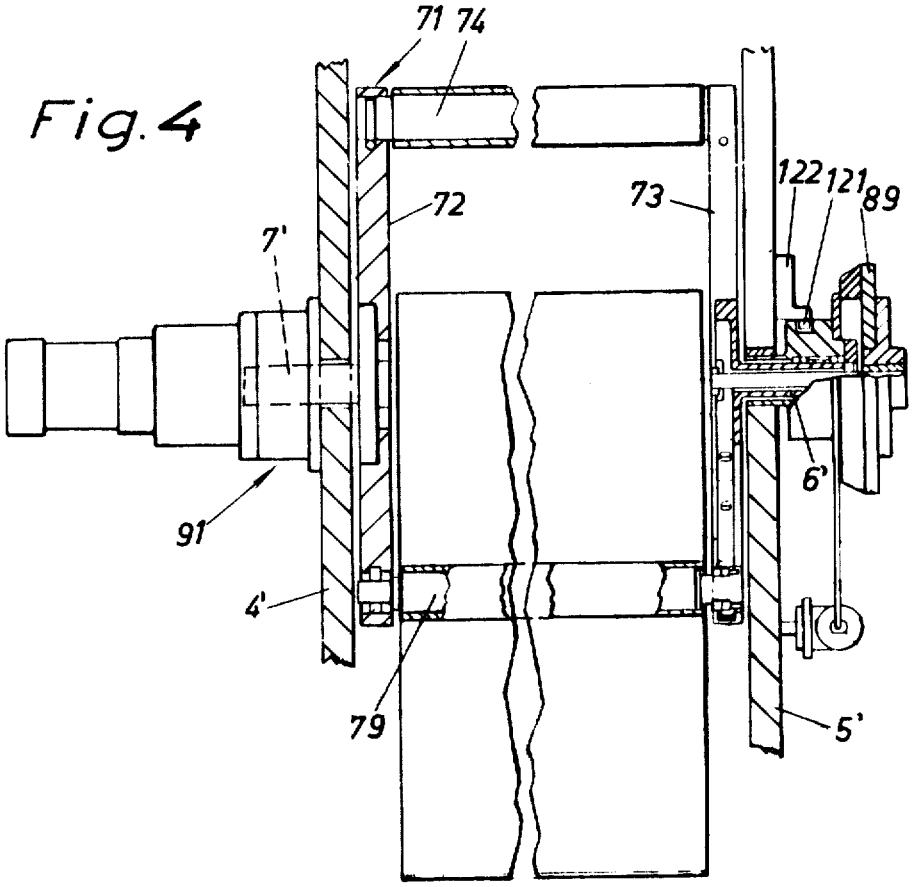
FIG. 4 is a partly broken longitudinal section through the roller stand taken approximately on the line IV—IV in FIG. 2.
Figure 6:
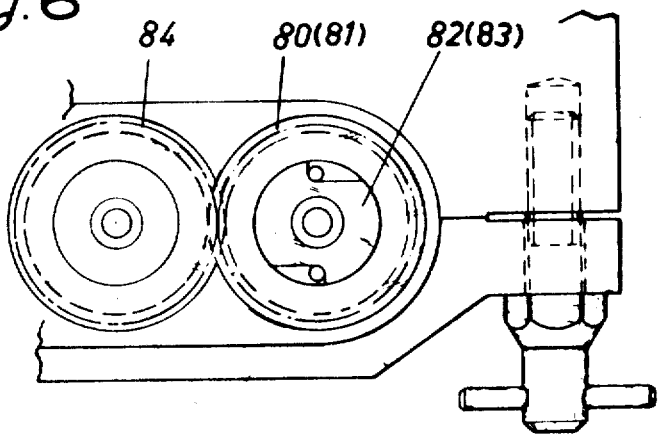
FIG. 6 illustrates on approximately the same scale an end view of one unwinding station of the roller stand.

In accordance with the embodiment illustrated in FIGS. 2 to 7, two frame end sections 4', 5' of the roller stand 1' (FIG. 4) are provided with two support shafts 6' and 7', respectively, by means of which a roll-holding device 71, incorporating two unwinding stations A' and B', is rotatably mounted in the frame 3' (FIGS. 2 and 3). The roll-holding device 71 consists of two end sections 72, 73 which are interconnected by two stationary shafts 74, 75 on each one of which is rotatably mounted a guide roll 76 and 77, respectively, to guide the paper web 11 intended to be fed into the printing unit 2'.

Into each unwinding station A', B' may be inserted a spindle 78 and 79, respectively, to hold its respective paper roll 12 and 12a. Each spindle 78, 79 supports at one of their ends a cog wheel 80, 81 which is rotatably mounted on its associated spindle and is driven via free-wheel member 82, 83 on the associated spindle. The cog wheels 80, 81 mesh via cog wheels 84 and 85 which are rotatably mounted in one 73 of the roll-holder end sections namely section 73, with a cog wheel 86 which is secured on one end of a shaft 87, the latter being pivotally mounted in one of the support shafts, shaft 6', of the roll-holding device 71. At its opposite end shaft 87 supports a means 88 arranged to engage and carry along in its movement a brake disc 89 which cooperates with a stationary support member 90. The roll-holding device 71 is turned step by step by a motor 91.

The roller stand also includes an acceleration roller 92 which is rotatably mounted at one end of an arm 93 which is mounted at its opposite end for pivotal movement about a shaft 94 and arranged to be swung by a piston-and-cylinder unit 95, 96 to the two end positions illustrated in FIGS. 2 and 3. The acceleration roller 92 is driven by belts or similar means 97 and 98 from a belt 99 driven by a magnetic coupling 100.

Above the unwinding station B' are pivotally mounted on shafts 101 two-arm levers 102 supporting on one of their arms a rotatably mounted press roller 103 and a brush 104. A piston-and-cylinder unit 105, 106 is arranged to pivot the levers 102 from an upper, neutral position to a lower position in which the brush 104 and the press roll 103 abut against the periphery 107 of the paper roll 12a introduced into unwinding station B'.

The roller stand 1' also comprises means to cut off the paper web 11 from the paper roll 12. In accordance with the embodiment illustrated, the cutting means is a knife 108 which may be turned by a pivot member 109 from the position illustrated in FIG. 2 to that in FIG. 3. In the latter position, the knife 108 crosses the paper web 11 and cuts off the latter by means of its edge.

Close to the outer end of the blade 108 is secured one end of brake belts 110 the opposite ends of which are secured at the lower part of the frame 3'.

The roller stand additionally comprises a number of conducting and tensioning rollers 111, 112 and 113 for the paper web 11.

Figure 1:
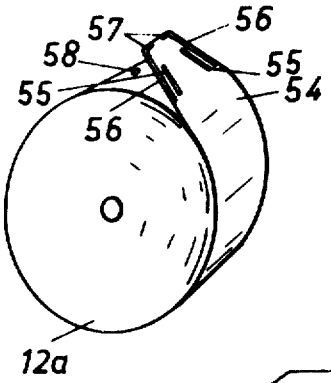
FIG. 1 illustrates the external face of the leading end of the web material of a roll.

To explain the functioning and operation of the various components of the roller stand, reference is initially made to the starting position illustrated in FIG. 2, wherein the roll 12 is in unwinding station A' and is being unrolled, and a new roll 12a (FIG. 1) which has been prepared—i.e. that its leading end 54 thereof has been provided with glue strands 55, 56, and 57 and with a weaker glue dot 58 at the external face of roll 12a opposite the leading end, intended to provisionally secure said end has been introduced into unwinding station B'. When the paper web 11 which runs over the guide roll 74 has been used up to such an extent that the diameter of roll 12 has decreased to appr. 120 mm, the piston-and-cylinder unit 95, 96 pivots the acceleration roller 92 into abutting position against the periphery 102 of the new roll 12a and the magnetic coupling 100 is switched on. This forces the roll 12a to rotate at a peripheral speed that essentially conincides with the speed of advancement of the paper web 11. The brush 104 and the press roller 103 are urged by the piston-and-cylinder unit 105, 106 into abutment against the unrolling web 11, pressing the latter against the leading end of the new roll 12a whereby this end is secured to the unrolling web 11 owing to the glue strands 55, 56, 57 thereon. The knife 108 is pivoted by pivot member 109 to the position illustrated in FIG. 3 and cuts off the paper web 11 from roll 12. During the cutting, the brake belts 110 are pressed against the periphery of roll 12, thus braking the latter. The acceleration roller 92 is returned to its starting position (FIG. 2) and the magnetic coupling 100 is switched off. The press roller 103 and the brush 104 are returned to their starting positions (FIG. 2). Also the cutting means 108 is returned to its starting position (FIG. 2). When the new roll 12a which originally has a diameter slightly over 1 meter, has decreased as a result of the unwinding of the web, to a diameter of appr. 360 mm, the roll-holding device 71 is turned clockwise as seen in FIGS. 2 and 3 over half a turn, in which case unwinding station B' will assume the position of unwinding station A', and unwinding station A' therefore will be easily accessible for introduction of a new paper roll.

During the entire time that the unrolling web 11 is being unwound as described above, the roll 12 is exposed to the braking effects from the brake disc 89, the latter being driven via shaft 87, cog wheels 86, 85, 84 and 81 and the free-wheel member 82 on the spindle 78. Then the unrolling web 11 has been cut off and the roll 12 decelerated the free-wheel member 82 becomes inoperative. Instead, free-wheel member 83 becomes operative, transferring the drive to the brake disc 89 from the spindle 79 via the cog wheels 81, 84, 85 and 86 and shaft 87 and follower means 88. In this manner roll 12a together with its paper web is decelerated to the required extent. Consequently, it is always the one of spindles 78, 79 that at the moment rotates at the highest speed that is exposed to the braking effects of the brake disc 89 with the aid of its associated one of the free-wheel members 82, 83.

Figure 5:
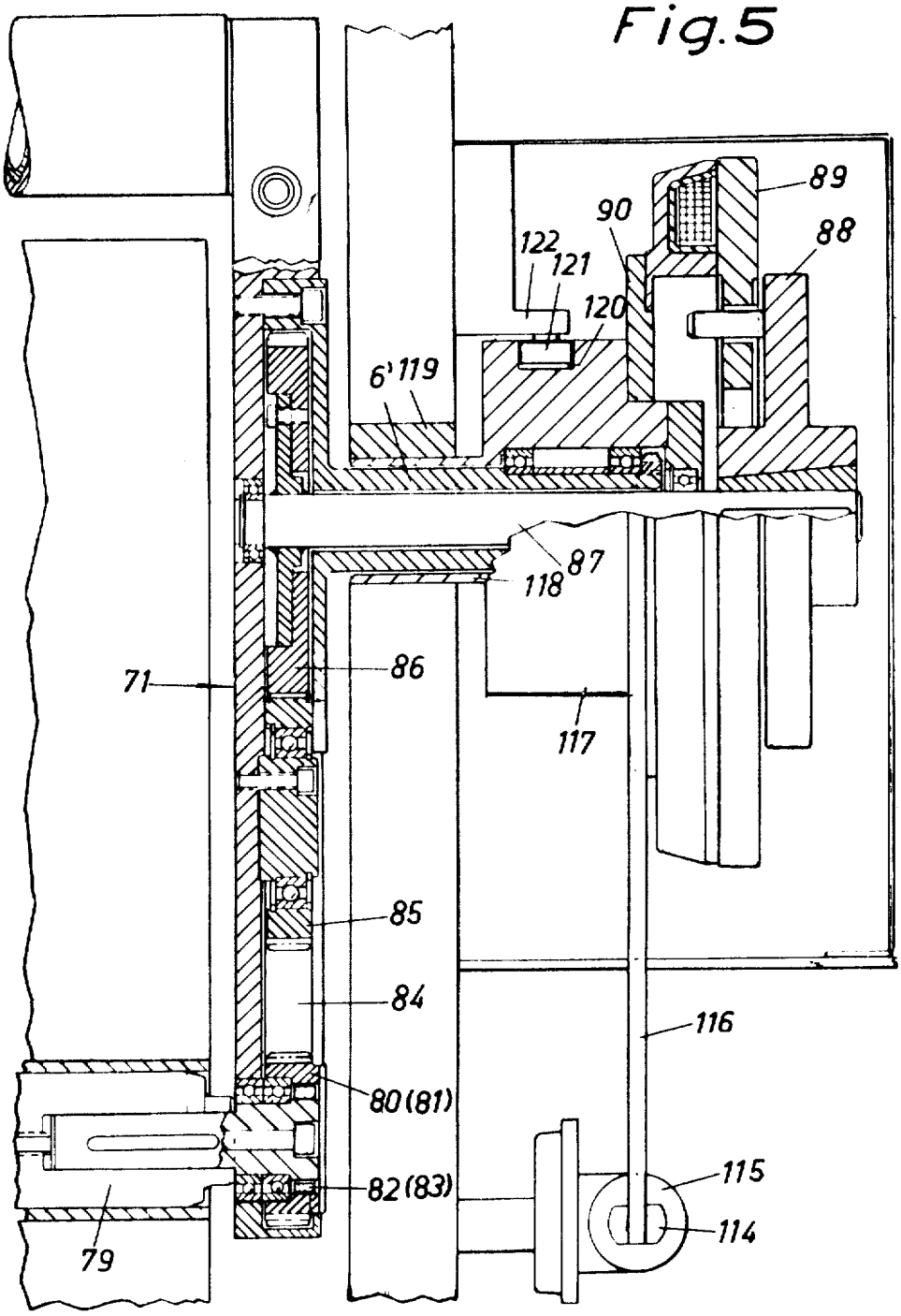
FIG. 5 illustrates on an enlarged scale the right-hand part of the longitudinal sectional view in accordance with FIG. 4.

Also in accordance with the embodiment just described, the roller stand is provided with a device allowing the paper web 11 to be displaced somewhat laterally during the unrolling so as to ensure that the web passes correctly through the printing unit 2'. For this purpose, the roller stand 1', as is illustrated particularly in FIGS. 5 and 7, is provided with an easily operable device for lateral displacement. This device comprises an arm 116 which is arranged to be pivoted by an adjustment mechanism 114, 115 and the upper end of which is secured in a cylindrical body 117 with an axial hub sleeve 118 thereon by means of which the body 117 may be turned and be axially displaceable in a bearing 119 on the frame 3'. The cylindrical body 117 is mounted on the support shaft 6' in such a manner as to allow turning of said body but not axial displacement thereof. At its periphery the body 117 is provided with an oblique groove 120 in which engages a roller 121 on a bracket 122 on the frame 3'.

When the arm 116 is pivoted by means of the piston-and-cylinder unit 114, 115, e.g. in the clockwise direction in accordance with FIG. 2, the cylindrical body 117 is forced by the cooperation between the stationary roller 121 and the parallel side edges of the groove 122 to move to the right in accordance with FIG. 5 (downwards in FIG. 7), the support shaft 6' and consequently also the roll-holding device 71 and the paper rolls 12, 12a supported thereby being urged to take part in this lateral displacement. Upon pivotal movement of the arm 116 in the opposite direction, the roll-holding device 71 and rolls 12, 12a and consequently also the paper web 11 of course are displaced laterally in a corresponding manner.

The roller stand 1, 1' comprises electric operating controls, such as limit switches and photoelectric cell equipment for automatic performance of the various control and adjustment operations. These means are not illustrated in the drawings as such means are well known to those skilled in the art. The same is true as regards necessary means and arrangements ensuring workmen safety.

The roll 12a of material may be brought to rotate by other means than by drive roller 92. For when press roller 103 which may be driven, presses the unrolling paper web 11 against the periphery of roll 12a the latter is brought to rotate at approximately the same periphery speed as the speed of advancement of the web. The means to slow down the material rolls 12, 12a may be in the form of a magnetic brake, a pneumatic brake or other, equivalent means.

What I claim is:

1. An improved roller stand comprising a frame, two unwinding stations, a first roll of a web of material, a first rotating spindle supporting said first roll, a second roll of a web of material, a second rotating spindle supporting said second roll, means for joining the web of material being unwound from said first roll to the leading end of the web of material of said second roll, means arranged to transversely cut said first web of material, and a braking mechanism supported by the frame of the roller stand to exert a braking force [an] *on* said roll support spindles, the improvement comprising a roll-holding device, *incorporating two end sections which are interconnected by stationary shafts, said shafts being parallel to said first and second rotating spindles and the centerlines of said shafts being included in a first plane which is at least approximately perpendicular to a second plane including the centerlines of said spindles and the intersection line between said first and second planes at least approximately coinciding with the rotation axis of said roll-holding device,* said two unwinding stations positioned on said roll-holding device, and means to transfer the rotational movement of the associated roll-support spindle to said braking mechanism, said means comprising two free-wheel members, one for each roll support spindle, said members arranged to connect to said braking mechanism that one of said two roll support spindles that at the moment has the highest rotational speed, *first cog wheels, one on each roll-support spindle at one end thereof, said cog wheels comprised in said means means to transfer the rotational movements of said roll support spindles to said braking mechanism, and second cog wheels rotatably mounted on support arms, said arms forming part of said roll-holding device, said second cog wheels arranged to mesh with said first cog wheels, and all cog wheels being mounted in a first of said end sections of said roll-holding device.*

[2. An improved roller stand according to claim 1, comprising first cog wheels, one on each roll-support spindle at one end thereof, said cog wheel comprised in said means to transfer the rotational movements of said roll support spindles to said braking mechanism, and second cog wheels rotatably mounted on support arms, said arms forming part of said roll-holding device, said second cog wheels arranged to mesh with said first cog wheels.]

3. An improved roller stand according to claim 1, wherein said roll-holding device is arranged to be turned step-by-step in said frame, *and wherein the turning movement is transmitted to that second end section of said roll-holding device which does not include said cog wheels.*

4. An improved roller stand according to claim 3, wherein said roll-holding device is arranged for axial adjustment laterally in said frame, *the lateral movement corresponding to said lateral adjustment being transmitted to said first end section of said roll-holding device, which includes said cog wheels.*

5. An improved roller stand according to claim 1, comprising a momentarily driven roller, said roller arranged to be moved into abutment against the periphery of said second roll the web of which is to be joined to the web of said first roll, said roller arranged to bring the peripheral speed of said second roll to approximately the same level as the peripheral speed of said first roll.

6. An improved roller stand according to claim 1, wherein said means arranged to cut said first unwinding web is connected to a supplementary braking mechanism, said mechanism arranged to apply a braking force on said roll of the unwinding web immediately following the completion of the cutting operation.

*7. An improved roller stand comprising a frame, two unwinding stations, a first roll of a web of material, a first rotating spindle supporting said first roll, a second roll of a web of material, a second rotating spindle supporting said second roll, means for joining the web of material being unwound from said first roll to the leading end of the web of material of said second roll, means arranged to transversely cut said first web of material, and a braking mechanism supported by the frame of the roller stand to exert a braking force on said roll support spindles, the improvement comprising a roll-holding device, incorporating two end sections which are interconnected by stationary shafts, said shafts being parallel to said first and second rotating spindles and the centerlines of said shafts being included in a first plane which is at least approximately perpendicular to a second plane including the centerlines of said spindles and the intersection line between said first and second planes at least approximately coinciding with the rotation axis of said roll-holding device, said two unwinding stations positioned on said roll-holding device, and means to transfer the rotational movement of the associated roll-support spindle to said braking mechanism, said means comprising two free-wheel members, one for each roll support spindle, said members arranged to connect to said braking mechanism that one of said two roll support spindles that at the moment has the highest rotational speed, the distance between said stationary shafts being approximately equal to the distance between said rotating spindles.*

*8. An improved roller stand comprising a frame, two unwinding stations, a first roll of a web of material, a first rotating spindle supporting said first roll, a second roll of a web of material, a second rotating spindle supporting said second roll, means for joining the web of material being unwound from said first roll to the leading end of the web of material of said second roll, means arranged to transversely cut said first web of material, and a braking mechanism supported by the frame of the roller stand to exert a braking force on said roll support spindles, the improvement comprising a roll-holding device, said two unwinding stations positioned on said roll-holding device, and means to transfer the rotational movement of the associated roll-support spindle to said braking mechanism, said means comprising two free-wheel members, one for each roll support spindle, said members arranged to connect to said braking mechanism that one of said roll support spindles that at the moment has the highest rotational speed, a housing located at an axial end of said roll-holding device, said means for transferring the rotational movement of the associated roll-support spindle to said braking mechanism including a plurality of intermeshing cog wheels extending from each spindle to a common cog wheel, said common cog wheel being operatively connected to said braking mechanism, said cog wheels located in said housing.*

* * * * *